United States Patent

[11] 3,608,691

| | | |
|---|---|---|
| [72] | Inventor | Harold J. Rosenberg<br>1408 Patuxent Drive, Ashton, Md. 20702 |
| [21] | Appl. No. | 860,379 |
| [22] | Filed | Sept. 23, 1969 |
| [45] | Patented | Sept. 28, 1971 |

[54] OVERLOAD CLUTCH
2 Claims, 5 Drawing Figs.

[52] U.S. Cl. ................................................. 192/24,
192/56 R, 192/110 R, 192/114
[51] Int. Cl. ........................................................F16d 11/04,
F16d 43/20
[50] Field of Search........................................... 192/55, 56,
24, 110 R, 114, 150

[56] References Cited
UNITED STATES PATENTS

| 3,103,999 | 9/1963 | Rabinow et al. | 192/56 |
| 3,194,371 | 7/1965 | Rabinow | 192/56 L |

*Primary Examiner*—Allan D. Hermann
*Attorney*—Max L. Libman

ABSTRACT: An improved overload and synchronizing clutch of the type shown in U.S. Pat. No. 3,103,999 obviates a problem of clutch sticking and wear, permits the clutch to be set up for either right-hand or left-hand drive without removing any major parts, and permits rapid change in operating torque range to be made.

PATENTED SEP 28 1971

Harold J. Rosenberg
INVENTOR

BY Max L. Libman

ATTORNEY

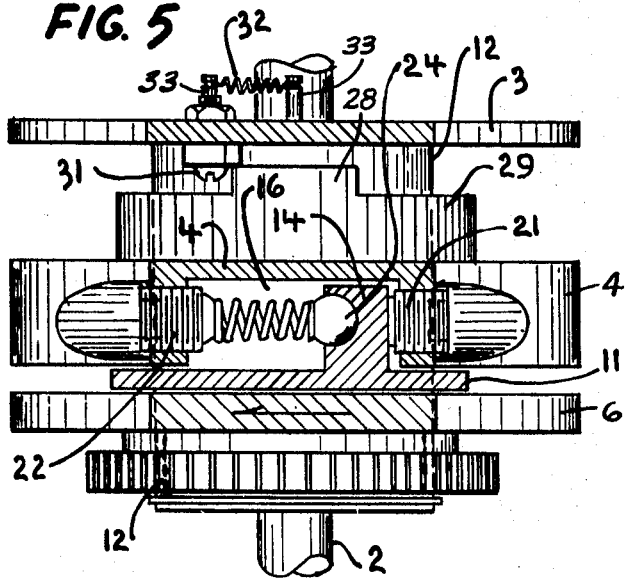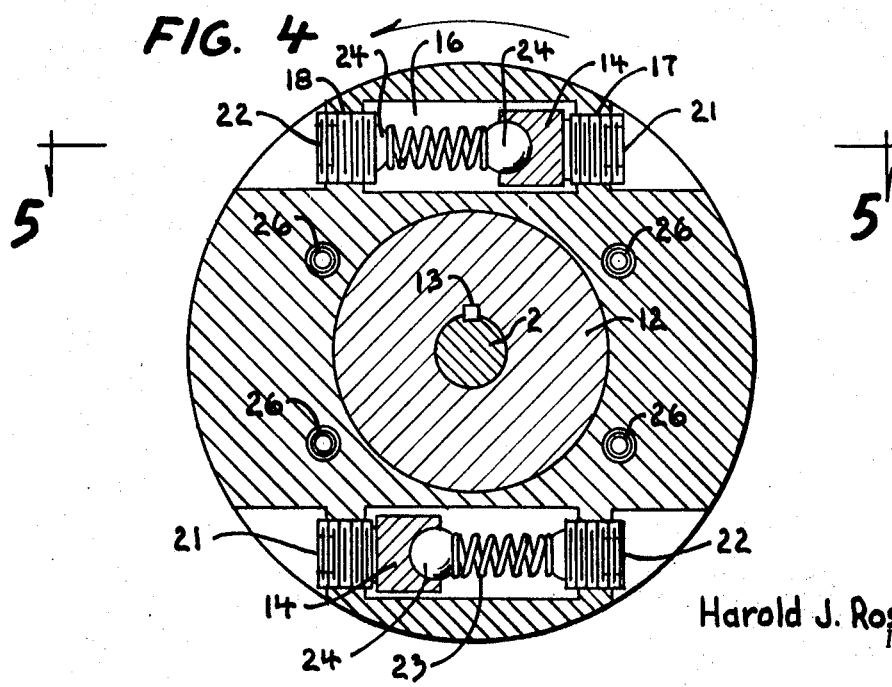

OVERLOAD CLUTCH

This invention relates to an improved overload and synchronizing clutch of the general type shown in U.S. Pat. No. 3,103,999 to Rabinow et al. The present clutch, like that of the Patent, has a power train consisting of three members, namely, a power input, an intermediate member and a power output member. Spring means couples the power input member with the intermediate member. The clutch is synchronous by virtue of having but one tooth respectively on the power output member and the intermediate member. In the driving position, the intermediate member is held by one or more interposers in an axial position at which the clutch teeth are engaged. Upon clutch overload, the spring, functioning as a torque-sensing device, yields, allowing relative rotation between the power output and the power input members. The interposers are mounted on the power input member and rotate together with the power input member, with respect to the intermediate member away from their interpose position, permitting the intermediate member to slide axially to a position in which the clutch teeth become disengaged. The disengaged clutch can be manually reset by means of a manual-actuating member, conveniently in the form of a lever yoke, having portion, namely the fork ends, located between the intermediate member and a power input member, and movable axially to reengage the intermediate member against its axial disengaging spring to a position allowing the interposers to assume their engaged relationship and thus hold the teeth engaged.

Other objects and advantages of my invention will become apparent as the following description proceeds, which description should be considered together with the accompanying drawings, in which:

FIG. 4 is a sectional view taken along line 4—4 of FIG. 1;

FIG. 5 is a sectional view taken along line 5—5 of FIG. 4.

Figure 1:
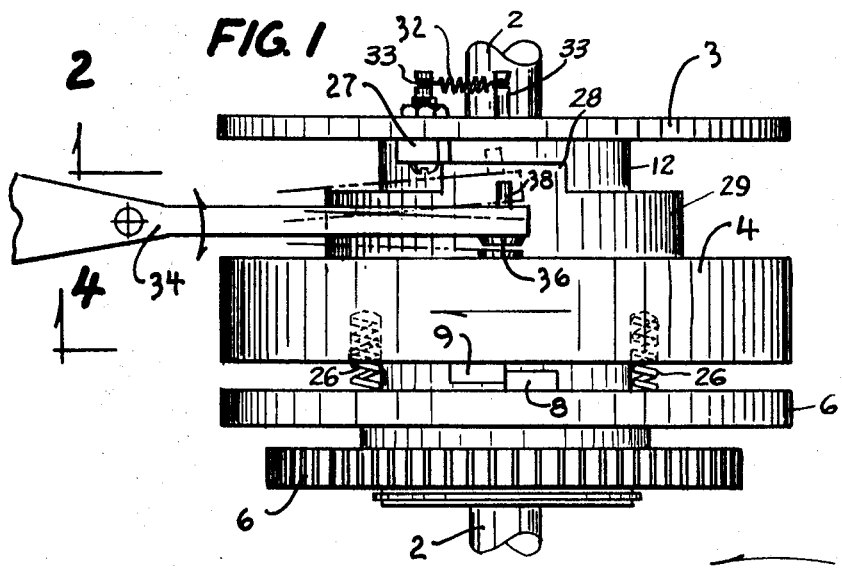
FIG. 1 is a side view of a clutch according to the invention, in the engaged position.

Referring to FIG. 1, a shaft 2 is provided which may serve as the power input means, and keyed to this shaft is a first rotary member 3, which is also fixed against axial motion relative to the shaft 2. Rotatively mounted on shaft 2 are intermediate member 4 and second rotary member 6, which may be either a gear wheel or a pulley wheel driving a pulley, as shown, to transmit rotary power from shaft 2 to any desired utilization device when the clutch is fully engaged. The second rotary member 6 is provided with a tooth 8 fixed to it which, in the axial position shown in FIG. 1, engages a tooth 9 fixed to the intermediate member. Disengagement of the clutch is accomplished by sliding the intermediate member 4 axially along the shaft toward first rotary member 3 until teeth 8 and 9 are disengaged, as will be explained more fully below.

Intermediate member 4 is rotatably mounted on carrier 11 which has a sleeve 12 keyed to the drive shaft 2 as shown at 13. Gear 6 is preferably mounted on sleeve 12 for free rotation thereon except as restrained by the engagement of teeth 8 and 9. Carrier 11 has an ear 14 protruding into a recess 16 in intermediate member 4. The recess 16 extends in a direction generally perpendicular to the radial direction, and is provided at each end with a threaded aperture 17 and 18 respectively into which are threaded screws 21 and 22 respectively. A short fairly stiff spring 23 is provided in aperture 16 with one end bearing against ear 14 and the other end against adjustable screw 22. If desired, ball bearings 24 may be provided at the ends of the spring 23 in order to minimize friction during relative axial motion of the carrier 11 and intermediate member 4. Screw 21 bears against the opposite end of ear 14 and thus serves as an adjustable stop which permits small corrections in the relative phase of the shaft 2 and the driven member 6 so that the load position may be accurately synchronized with the shaft, as is often desired when a number of different units are driven from the same shaft and must be maintained in synchronism. Stop screws 21 and 22 also serve as adjustments so that both ears 14 will bear equally, thus eliminating expensive production machining tolerances. As shown in FIG. 4, two such springs 23 are preferably provided in a balanced arrangement, but more or fewer may be used.

Figure 3:
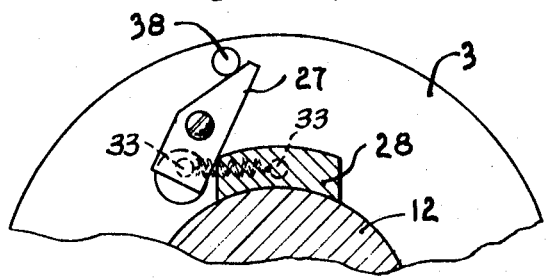
FIG. 3 is a fragmentary view similar to that of FIG. 2, but with the clutch in the disengaged position.
Figure 2:
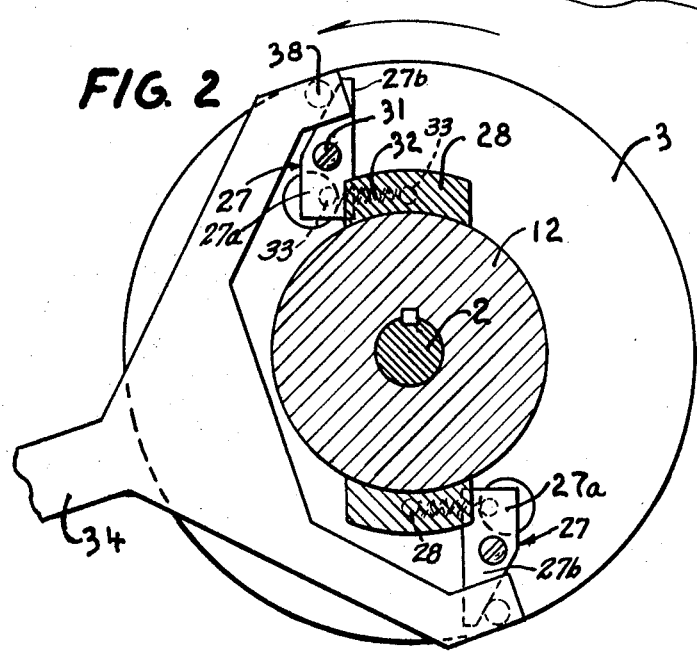
FIG. 2 is a sectional view taken along line 2—2 of FIG. 1.

Intermediate member 4 is biased by springs 26 toward first member 3, so that it tends to disengage teeth 8 and 9. However, such disengagement is prevented by interposers 27, shown as two in number, although more or less may be employed, from moving to a disengaged position of the teeth 8 and 9. The projections 27a of the interposers, in the normal driving position of the clutch, engage lugs 28 which extend radially from sleeve 29 which is a part of intermediate member 4. The interposers are mounted on pivots 31 and are normally biased by spring members 32 supported on pins 33 into an approximately radial position wherein the interposer blocks disengagement of the teeth 8 and 9. Under overload conditions, the spring 23 is compressed, causing intermediate member 4 to move angularly with respect to first rotary member 3 so that the lugs 28 clear the interposers 27 and the axial biasing springs 26 therefore force intermediate member toward first rotary member 3 thus disengaging teeth 8 and 9. This removes the compressional force from spring 23, causing it to move angularly back into its original position with respect to member 3, and since lug 28 is now in the same plane as interposer 27, it rotates interposer 27 about its pivot against the action of spring 32 into the position shown in FIG. 3.

When the overload condition has been corrected and it is desired to reengage the clutch, this can be accomplished by manually moving fork 34 so that its end 36, which may be provided with a headed pin for this purpose, axially presses intermediate member 4 against the action of axially biasing springs 26 so that the teeth are reengaged. It will be noted that the interposers 27 cannot possibly jam during this operation, as they are only lightly pressed against the lugs 28 by their biasing springs 32. However, as soon as the lugs 28 have moved sufficiently toward tooth engagement position to clear the interposers, the interposers move back into their original position between lugs 28 and member 3, so that when the pressure on actuator 34 is removed, the clutch returns to its normal running condition. This operation can be performed under load, as the springs 23 take up the shock of initial engagement.

If desired, the clutch teeth can be disengaged while in the normal running position, even without overload occurring, by manually moving actuator 34 in the opposite direction from that previously described above in order to reengage the teeth. A pin 38 is provided at the end of the fork on the side opposite from headed pin 36, and this pin 38 is thus moved into the path of travel of the actuators as they rotate with the entire clutch assembly, striking the projections 27b of the interposers 27 on the opposite side of the pivot radially away from the engaged side by lug 28. This causes the interposers to be rotated about their pivot 31 in the proper direction to clear the lugs 28, thus permitting disengagement of the teeth 8 and 9 under the axial bias of springs 26.

It will be noted that screws 21 and 22 are interchangeable, so that the clutch can be driven in either the right- or left-hand direction from the shaft, and this change can be made without removing the pulley or clutch from the shaft by simply removing the two screws, extracting the spring, and reinserting them in reverse position. Similarly, if it is desired to change the torque range of the clutch, a stiffer or a weaker spring can readily be inserted by simply removing the screw 22 and the spring and replacing the spring with one of the desired strength.

Due to the central pivoting at 31 of the interposer, and the fact that in the disengaged position of the clutch (FIG. 3) the lug 28 strikes the interposer at a portion radially inward from the pivot, while in reengaging the teeth, the lugs 28 engage the interposer at a point radially outward from the pivot 31, no cocking or jamming pressure is put upon the pivot point 31, it does not require to be especially well made and closely fitted, as formerly the case.

I claim:
1. a. An overload clutch comprising b. a first rotary member,
c. an intermediate member mounted for rotation with said first member and also for axial motion into two different positions with respect to said first member, said intermediate member having a lug on the side adjacent said first member,
d. a second rotary member mounted coaxially with said first member,
e. at least one first tooth on said intermediate member and at least one other tooth on said second member engageable with said first tooth in a first axial position of said intermediate member,
f. resilient means biasing said intermediate member into a position away from said second member wherein said teeth are disengaged,
g. an interposer between said first rotary member and said lug of the intermediate member holding said intermediate member against the force of said resilient means in the second axial position wherein said teeth are engaged,
h. drive spring means drivingly connecting said first member and said intermediate member so that said drive spring means yield upon clutch overload permitting said first member to move angularly with respect to said intermediate member sufficiently to clear said interposer, and allowing said resilient means to move said intermediate member into said second axial position to disengage said teeth,
i. said interposer being pivotally mounted for rotation about a point near its center and having a first projection radially inward of said pivot point with respect to the central axis of the rotary members, said projection being the interposed part, and having another projection radially outward of said pivot,
j. a clutch actuator having a part extending between said first member and said intermediate member and movable axially to reengage said teeth against the force of said resilient means after disengagement of the teeth;
k. spring means biasing said interposer toward a position between the lug and said first member to hold said teeth engaged after operation of the actuator,
l. means on said actuator engageable with said other projection of the interposer to rotate it about its pivot sufficiently to disengage said teeth,
m. said first projection of the interposer in the disengaged position of the clutch teeth being positioned to press against said lug without jamming,
n. said drive spring means being a short stiff spring located in a recess in said interposer, adjusting screw means at one end of said recess adjustably restraining one end of the spring and drive lug means on said first rotary member extending into said recess engaging the other end of said spring,
o. and stop screw means at the other end of said recess for engaging said lug in the fully extended position of said stiff spring, said stop screw means and said adjusting screw means and spring being interchangeable for optional right- and left-hand drive.

2. a. An overload clutch comprising
b. a first rotary member,
c. an intermediate member mounted for rotation with said first member and also for axial motion into two different positions with respect to said first member, said intermediate member having a lug on the said adjacent said first member,
d. a second rotary member mounted coaxially with said first member,
e. at least one first tooth on said intermediate member and at least one other tooth on said second member engageable with said first tooth in a first axial position of said intermediate member,
f. resilient means biasing said intermediate member into a position away from said second member wherein said teeth are disengaged,
g. an interposer between said first rotary member and said lug of the intermediate member holding said intermediate member against the force of resilient means in the second axial position wherein said teeth are engaged,
h. drive spring means drivingly connecting said first member and said intermediate member so that said drive spring means yield upon clutch overload permitting said first member to move angularly with respect to said intermediate member sufficiently to clear said interposer, and allowing said resilient means to move said intermediate member into said second axial position to disengage said teeth,
i. said interposer being pivotally mounted for rotation about a point near its center and having a first projection radially inward of said pivot point with respect to the central axis of the rotary members, said projection being the interposed part, and having another projection radially outward of said pivot,
j. a clutch actuator having a part extending between said first member and said intermediate member and movable axially to reengage said teeth against the force of said resilient means after disengagement of the teeth;
k. spring means biasing said interposer toward a position between the lug and said first member to hold said teeth reengaged after operation of the actuator,
l. said drive spring means being a short still spring located in a recess in said interposer, adjusting screw means at one end of said recess adjustably restraining one end of the spring and drive lug means on said first rotary member extending into said recess engaging the other end of said spring,
m. and stop screw means at the other end of said recess for engaging said lug in the fully extended position of said stiff spring, said stop screw means and said adjusting screw means and spring being interchangeable for optional right- and left-hand drive.